United States Patent

[11] 3,614,453

[72] Inventor Richard M. Johnson
3815 Weeburn Drive, Dallas, Tex. 75229

[21] Appl. No. 26,557
[22] Filed Apr. 8, 1970
[45] Patented Oct. 19, 1971

[54] RADIATION SENSITIVE CASSETTE LEADER DETECTOR
10 Claims, 3 Drawing Figs.

[52] U.S. Cl. .......... 250/219 FR, 179/100.25
[51] Int. Cl. .......... G01n 21/30
[50] Field of Search .......... 250/219 F, 222; 356/199, 200, 237, 238; 179/100.25

[56] References Cited

UNITED STATES PATENTS

| | | | |
|---|---|---|---|
| 2,952,416 | 9/1960 | Sampson .......... | 250/219 X |
| 3,053,986 | 9/1962 | Loepfe et al. .......... | 356/159 |
| 3,450,887 | 6/1969 | Nirenberg .......... | 250/219 |
| 3,308,301 | 3/1967 | Weissbach .......... | 250/219 |

*Primary Examiner*—Walter Stolwein
*Attorney*—Giles C. Clegg, Jr.

ABSTRACT: A standard cassette for 0.15 inch magnetic tape provides a tape path adjacent to one edge which passes through a recess having an outward facing surface that is reflective. A detector unit includes a light source for directing light toward the reflective surface and a detector for detecting light reflected from this surface. A control device response to the intensity of reflected light stops the tape drive. The path of directed and reflected light is through the tape which acts as a shutter. Both the light source and the detector are shielded when the tape is opaque but light from the source is reflected onto the detector when the tape is transparent. The output of the detector is a control signal indicating the character of the tape.

INVENTOR,
RICHARD M. JOHNSON
BY Giles C. Clegg, Jr.
ATTORNEY

INVENTOR,
RICHARD M. JOHNSON
BY
[signature]
ATTORNEY

RADIATION SENSITIVE CASSETTE LEADER DETECTOR

This invention relates to detector apparatus; and more particularly to a detector for generating a control signal indicating the presence of a leader on a spool of magnetic tape.

In the loading of tape cassettes, it is usual practice to attach the two ends of the tape to the two spools or reels by means of leaders which are fabricated of a tape which is more rugged than the oxide coated portion on which the magnetic information is recorded. The leaders are attached in a manner that the tape will not be damaged when the end is reached if the tape is moving at normal speeds. However, when the tape is driven at fast speeds and stopped abruptly in this manner, stresses are created in the leader which actually cause rupture of the tape. It is also of great importance that "write" operations not be performed except when the oxide coated portion of the tape spool is passing across the record head.

In accordance with the invention, the detector cooperates with a cassette having an outward opening recess with a partially reflecting surface at the base of the recess, and a tape path passing through the recess between the reflective surface and the recess opening. A detector unit includes a light source for directing light toward the reflective surface and a light detector for detecting the reflected light. The tape functions as a shutter which shields the light source and detector when the opaque oxide coated portion of a spool of tape passes adjacent the detector unit. However, when the relatively transparent tape leader passes the detector unit, light from the light source is transmitted through the leader and reflected from the reflective surface through the leader onto the light detector. The change in intensity of light impinging upon the detector is sensed by the detector which produces an output indicating the pressure of the leader portion of the tape spool. The present invention provides detector apparatus which provides a control signal when the leader portion of a spool of tape carried by a cassette is sensed. The control signal can be used, for example, to either slow or stop the tape drive system or to exhibit write or record operations.

DRAWING

The novel features of the invention as well as many objects and advantages thereof will be understood more fully from the following description when read in connection with the accompanying drawings in which.

DESCRIPTION OF THE PREFERRED EMBODIMENT

The figures in the accompanying drawing are fragmentary views of a magnetic tape unit, sometimes referred to as a "tape deck" or "tape module," which includes means for supporting the tape which is stored conveniently in a tape cassette, and which includes the mechanical and electrical components for the processing of the tape for the reading and writing of the magnetic signals onto and from the tape.

Figure 1:
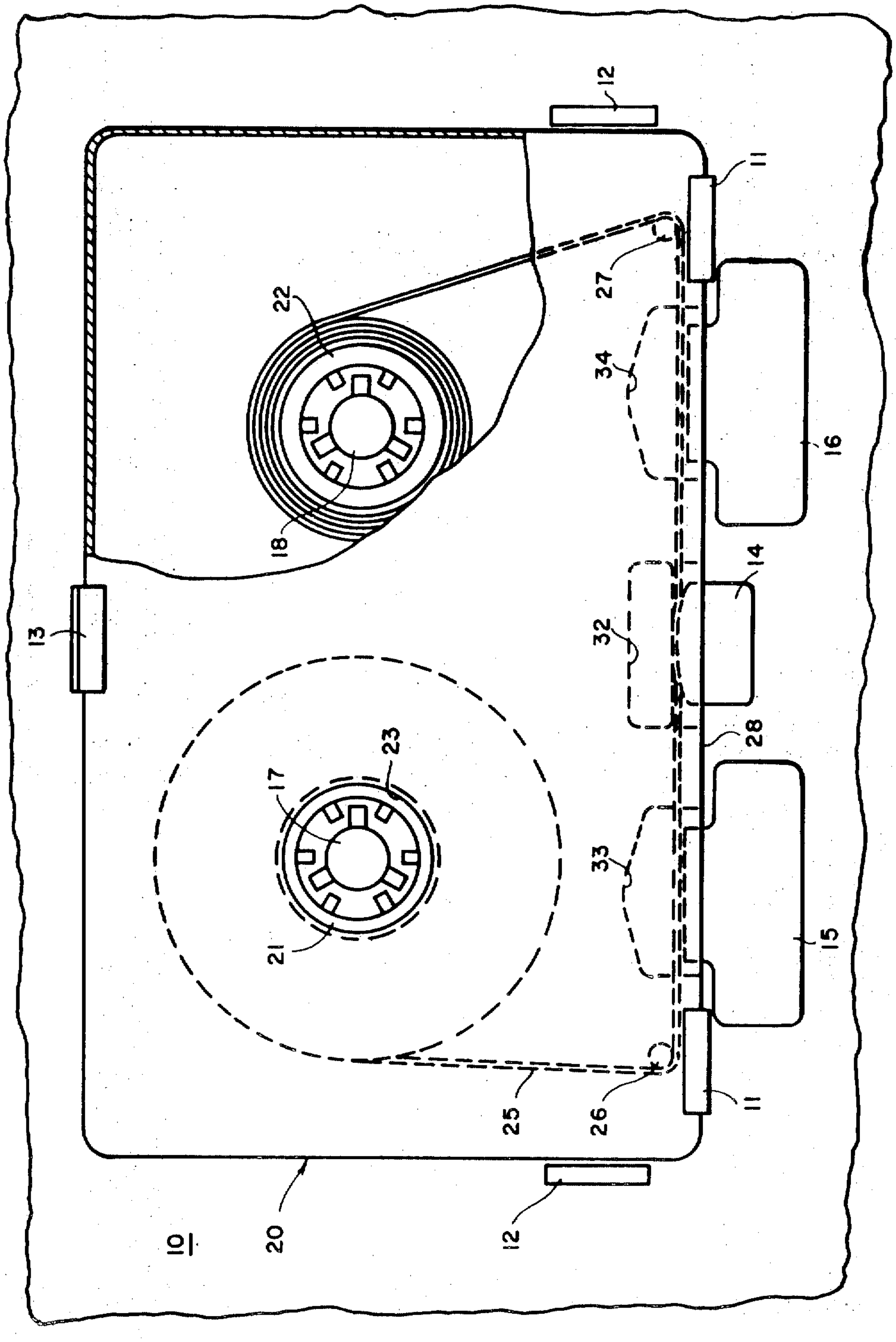
FIG. 1 is a fragmentary view of a tape drive unit including means for mounting a tape cassette.

FIG. 1 is a fragmentary view looking at the front wall or plate 10 for example, of the housing of a tape unit, with the front plate 10 having means for positioning and supporting a tape cassette 20 in operative position on the tape unit. The positioning and supporting means, by way of example, includes lower support brackets 11, side guide bosses 12 and an upper spring clamp 13, providing for convenient mounting and removal of the cassette. Other components of the tape unit, which will be referred to subsequently, are a magnetic head 14 for transferring magnetic information to the tape or removing it therefrom, detector units 15 and 16, and splined drive spindles 17 and 18 for driving the tape spools of the cassette 20.

Still referring principally to FIG. 1, the tape cassette 20 consists of a generally flat rectangular housing, fabricated of a plastic, for example, viewed from one side face in the figure. The form of cassette illustrated in FIG. 1, is a standard configuration for 0.15 in. tape having external dimensions of approximately 4 in. × 2½ in. × ⅝ in. Two tape spools 21 and 22 are mounted for rotation within the cassette with the hubs of the spools exposed respectively in apertures 23 and 24 which extend transversely through the cassette. Each of the hubs has a central bore with radially inward extending teeth to receive one of the splined drive spindles 17 or 18 in driving relation. The two ends of the tape 25 are secured to the spools in a known manner such that the tape will not be withdrawn from a spool when the end of the tape is reached during operation. The tape and its path between the two spools, are indicated by phantom lines in FIG. 1. The tape path extends downwardly from the left hand spool 21 as viewed in FIG. 1, around a guide pin or sleeve 26 adjacent to the lower left hand corner of the cassette, then along the length of the cassette adjacent to the lower edge 28 thereof, then around the guide pin of sleeve 27 adjacent to the lower right hand corner of the cassette, then to the right hand spool 22.

The path of the tape adjacent to the lower edge 28 between the guide pins 26 and 27 traverses or passes through three recesses 32, 33 and 34 which are defined by openings in the edge wall 28 and by internal transverse walls or partitions within the cassette, as will be described more fully.

Figures 2, 3:
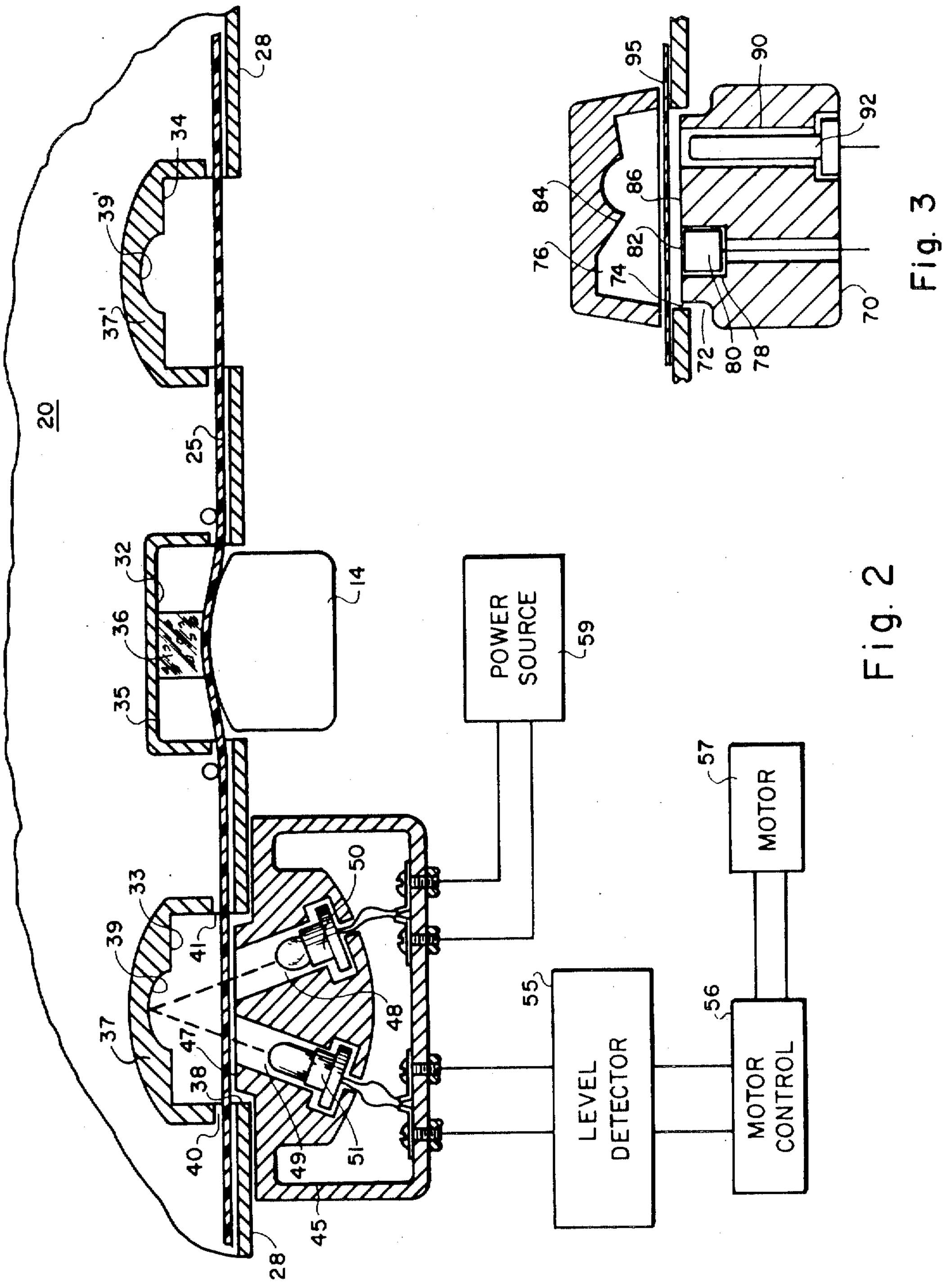
FIG. 2 is a fragmentary sectional view of a portion of the tape cassette and of a light detector unit associated with the tape unit, with other units of the system shown in block diagram.
FIG. 3 is a fragmentary view similar to FIG. 2 illustrating another embodiment of the invention.

The recess 32 is centered between the ends of the cassette and is dimensioned to accommodate a portion of the magnetic head 14 which extends into the recess when the cassette is supported on the tape unit in operating position. As best seen in FIG. 2, which includes a fragmentary sectional view of the cassette in a plane parallel to the face shown in FIG. 1, the recess 32 is defined by partition 35; and the head 14 extends into the recess sufficiently to deflect the tape 25 from its planar path adjacent to the edge 28. This deflection is provided to assure engagement of the tape with the upper curvature of the head 14; and this contact is further assured by the placement of a compressible member 36, fabricated of foam or rubber or plastic for example, to urge the tape against the head.

The recess 33 is formed by a transverse partition 37 of the cassette and the adjacent opening 38 in the edge wall 28. The base of this recess 33, which is defined by the partition 37, may include a concave surface portion 39 which is formed by a semicylindrical surface, defined about a transverse axis, toward the recess opening 38. As best seen in FIG. 2, the tape path passes through the recess 33 through suitable openings or slots 40 and 41 formed between the partition 37 and the edge wall 38, and which serve to define the tape path adjacent to the edge wall 28. The tape, moving in a plane parallel to the edge wall, defines a shutter between the concave surface 39 and the recess opening 38.

The recess 34, on the opposite side of the head recess 32, is of the same general configuration as recess 33. The recess 34 is spaced from the head recess 32 and formed by partition 37 having a reflective surface 39'.

As best seen in FIG. 2, one embodiment of the light detector unit 15 includes a housing 45 fabricated of any suitable material and preferably includes a boss 46 which is received within the opening 38 of the recess 33 to provide a surface 47 which lies close to the outer surface of the tape 25. While the drawing shows considerable space between the surface 47 and the tape, this clearance as well as others in the drawing are exaggerated for purposes of clarity. Internal partitions of the structure of the housing 45 provide socket chambers 48 and 49 for the purpose of accommodating and locating respectively a socket and light assembly 50 and a socket and photocell assembly 51. The chambers 48 and 49 are separated by a suitable partition, with both chambers opening to the surface 47 facing into the cassette recess 33.

The light chamber 48 is oriented to direct light toward the concave cylindrical surface 39; and the photocell chamber 49 is oriented so that the photocell is illuminated by light reflected from the concave surface 39. The chamber openings in the housing surface 47 are preferably sized so that the tape 25 substantially covers the openings. With this arrangement, very little light will be reflected to the photocell while the signal portion of the tape 25 is passing through the recess 33, since the oxide coated portion of the magnetic tape is, of course, quite opaque and is provided with a relatively dull finish so that the reflective qualities are poor. Conversely, when a relatively transparent tape leader enters the recess 33 the intensity of reflected light will be much greater, such that a change in light level may be readily detected by the photocell.

As shown in FIG. 2, an exemplary control system for use with the light detector unit 15 includes a level detector 55 for detecting a voltage output signal from the photocell and producing a control signal. The control signal can be applied, for example, to a motor control 56 when the detected voltage signal achieves a predetermined level. The motor control 56 may then either reduce or shut off the power to an electric motor 57 which drives the drive spindle 18 for the cassette spool 22. The light 50 is energized from a power source 59.

A second detector unit 16 can optionally be mounted on the opposite side of the head 14 for coaction with the reflective surface of the recess 34. The second detector unit 16 can be the same configuration as the unit 15 and is associated with corresponding control components (not shown) to control a drive motor for the drive spindle 17 when the spool 21 is driven to transport the tape in the reverse direction. The corresponding components associated with the detector unit 16 are identified by the same reference number printed. However, generally the provision of the second detector unit is neither desirable nor necessary.

The light detector illustrated in FIG. 3 of the drawings comprises a housing 70 which includes a boss 72 for extending into the opening 74 of the recess 76. The boss preferably fills the opening for shielding the recess from ambient light. The housing 70 defines a cavity 78 in which a photosensitive device 80 includes active elements positioned in surface 82 which is in an opposing relationship to the reflective surface 84 of the recess 76. It is practical for the surface 82 to be substantially coplanear with the surface 86 of the housing 70. Still a second cavity 90 is provided for receiving a lamp 92. The cavity 90 opens toward the surface 84 and the lamp is recessed slightly within the cavity away from the surface 86 to minimize the possibility that light from the lamp, except that reflected from the surface 84, will impinge upon the photoelectric device 80.

As described previously with reference to FIGS. 1 and 2 of the drawings, the tape 95 traverses the path which is close to the surface 86 effectively masking both the lamp 92 and the photoelectric device 82 thereby restricting the amount of radiation from either the lamp or from ambient sources which impinge upon the photocell 80 so long as the oxide coated, opaque portion of the tape is traversing a path across the photosensitive device. However, when the leader portion of the tape is present at the location of the detector unit, light from the lamp will be transmitted with very little attenuation onto the reflective surface 84 and reflected onto the photosensitive device 80. The electrical characteristics of the photosensitive device 80 will change in a detectable manner providing a control signal which can be used for many purposes, such as either causing the motor to run at a lower speed or causing the motor to stop. Of great importance in many applications, the control signal from the detector unit indicating the presence of the leader can be applied to a recorder control unit which performs desired control functions, such as preventing the recording of information, in response to the control signal from the detector unit.

It is important to note that it is not necessary that the recess include a concave portion such as the portion 39 of FIG. 2 of the portion 87 of FIG. 3, nor is it necessary that the light source and photocell be focused onto a shaped surface. It is only necessary that the recess have an outwardly facing surface characterized by sufficient reflectivity of light that the light reflected onto the photocell from the lamp when the leader portion of the tape is positioned over the lamp and photocell will be substantially greater than the ambient light impinging on the photocell when the opaque, oxide coated portion of the tape is positioned over the photocell. It is preferred that the outwardly facing portion of the recess be of a light color, opaque material to increase the reflectivity of the surface. However, if ambient light levels are low, it is practical for the cassette to be of transparent or dark material.

In those instances in which the cassette is not provided with the concave surface such as the surface 39 or if the concave portion of the recess is not conveniently positioned for focusing the lamp and photocell, it is practical for the detector unit to be constructed as shown in FIG. 3 of the drawings. A detector unit as shown in FIG. 3 is generally preferred as its satisfactory operation is not dependent upon the shape of the reflective surface of the partition 37 or positioning of the detector device relative to a concave surface 39 which may be present.

Although the invention has been described with reference to particular preferred embodiments thereof, many changes and modifications will become apparent in view of the foregoing description which is intended to be illustrative and not limiting of the invention defined in the claims.

What is claimed is:

1. In a magnetic tape recording-playback system for use with a tape having an opaque magnetic portion and at least one transparent end, said tape being carried within a standard cassette including a light reflective cassette recess having a backwall and an exterior opening with the tape traversing a path adjacent the exterior opening and between rotatable reels on which the tape is stored including means for supporting the cassette in operating position and drive means for driving said rotatable reels to transport the tape between reels, the improvement comprising:

a. A detector unit having a wall surface, a light chamber and a light detecting chamber each opening into said wall surface, b. A source of light positioned in said light chamber for directing light outward through the opening in said wall surface, c. Light detecting means positioned in said light detecting chamber for detecting light impringing upon the light detecting means, d. Mounting means for mounting the detector unit with the wall surface in opposed relationship to the opening of the cassette recess and closely adjacent the path traversed by the tape, e. The light from said source of light being masked from said light detecting means by said tape when the tape between said detector unit and said cassette recess is opaque, g. Means responsive to light reflected onto said light detecting means for generating a control signal to control said drive means.

2. Apparatus as defined in claim 1 wherein the detector unit comprises a housing mounted on said tape unit adjacent to the position of the cassette recess opening and wherein the detector unit housing includes a substantially flat wall surface adjacent to and substantially closing the cassette recess opening.

3. Apparatus as defined in claim 2 wherein said wall surface is positioned closely adjacent the path traversed by said tape whereby said tape acts as a shutter to selectively permit light from said source of light to be reflected from said back wall onto said light detecting means.

4. Apparatus as defined in claim 3 wherein said source of light is recessed into said light chamber.

5. Apparatus as defined in claim 4 wherein said light detecting element includes an active surface positioned closely adjacent the path of said magnetic tape.

6. Apparatus as set forth in claim 1 wherein said light detecting means includes a photocell for producing a signal responsive to the level of light illuminating the photocell;

said control signal generating means including a level detector for producing a control signal responsive to a predetermined level of the photocell signal.

7. Apparatus as set forth in claim 6 further including means responsive to said control signal for affecting the speed at which said tape is driven.

8. Apparatus as defined in claim 1 wherein said magnetic tape functions as a shutter to permit light from said light directing means to be reflected onto said light detecting means when a leader portion of said tape is present but restricting the amount of light reflected from said light directing means onto said light detecting means when an oxide coated portion of said magnetic tape is present.

9. Apparatus as defined in claim 1 wherein said detector unit includes means shielding said recess and said reflective surface from incident light other than that generated by said source of light.

10. Apparatus as defined in claim 1 wherein said cassette includes a body defining said recess formed of a light colored plastic material.